J. P. JOURDA.
RAISING SUNKEN VESSELS.
No. 16,487. Patented Jan. 27, 1857.
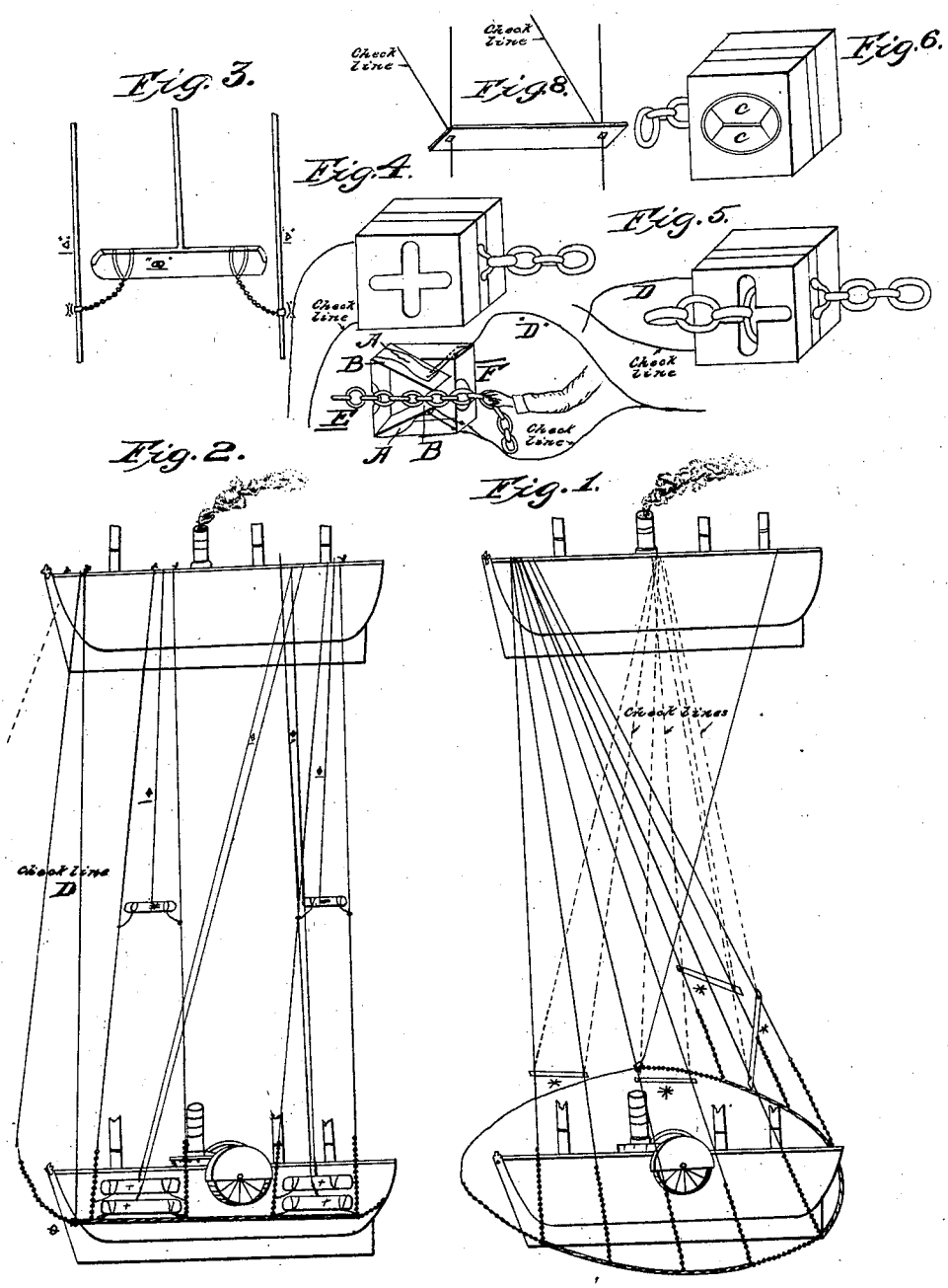

UNITED STATES PATENT OFFICE.

JOHN P. JOURDA, OF NEW YORK, N. Y.

RAISING SUNKEN VESSELS.

Specification of Letters Patent No. 16,487, dated January 27, 1857.

*To all whom it may concern:*

Be it known that I, JOHN PIERRE JOURDA, of the city of New York, in the county of New York and State of New York, have invented an entirely new and useful Apparatus for the Purpose of Raising Sunken Vessels out of Either Deep or Shallow Water; and I do hereby declare that the following is a true and correct description of the operation.

By referring to the accompanying drawings and the marks and letters of reference thereon it can be fully appreciated and understood.

Figure 1, is a longitudinal view of a sunken vessel showing the action of securing it by the apparatus (previous to the application of the flotillas) with chain dividers (marked thus *) attached.

Fig. 2, represents the longitudinal bow of a sunken vessel, safely secured by the apparatus. It does not signify whether it is secured from stem to stern, or amidships, because when once the apparatus is tightened around the sunken vessel it is impossible for it to escape from its embrace, unless the director of the apparatus wills it. There are four flotillas (marked thus +) attached to the apparatus around the sunken vessel and showing their position upon the sunken vessel, during the action of inflation. There are two flotillas, marked # showing the action of passing them down the lines to their respective positions upon the sunken vessel. These lines marked ◇ represents the tubes connected to the flotillas which are used for the purpose of conveying atmospheric air into the flotillas, after they are affixed to the vessel below. That part of the apparatus marked thus ⊖ in Fig. 2, shows the position of the king snappers (so called because it is the largest used upon the apparatus). After the sunken vessel is secured by the circumambulating chain.

Fig. 3, represents a flotilla mark thus ∽. Those two perpendicular lines marked thus △ are intended to represent the passage lines down which the flotillas are conveyed in a collapsed state to their respective positions in the side of the sunken vessel through the aid of the chain snapper marked thus ⋈.

Fig. 4, represents the under side of the snapper or chain bight showing the orifice or opening through which the chain is passed. This orifice in some of the snappers is of an oval shape, as is represented in Fig. 6.

Fig. 5 represents the same vein of the snapper showing the action of the chain passing through the orifice.

Fig. 6, is a representation of the top side of the snapper showing the teeth marked C which act upon the links of the chain which passes through them.

Fig. 7, represents an interior view of the snapper. That position marked A shows the action of the spring upon the teeth, marked B. The chain is inserted at that end which is marked E, and drawn through that end which is marked F. Thus it is impossible for any chain to return unless the check line marked D which is affixed to the opening marked A be pulled. In the event of that the chain will immediately slip back, and will continue to do so till all the chain runs out. For instance supposing the sunken vessel to be secured all right and tight by the apparatus and the weather should become so rough as to put an end to all further operations that day, it would then be necessary to disconnect the apparatus from the sunken vessel, the order would be to the man in charge of the check line, Stand by to ease king snapper, which object would be attained as soon as they commence pulling the check line marked D in Fig. 2, connected with the king snapper. The apparatus would immediately become disconnected and one flotilla is sufficient to raise the whole apparatus to the surface.

Fig. 8, represents the rope floats or chain dividers, which are composed of wood with a small snapper in each hole at each end. They are used for two purposes: In the first place they are sent down with the apparatus as is represented in Fig. 1, for the purpose of dividing the chains, so that they may be placed at equal distances around the vessel where they are left until the vessel is secured by the apparatus, when the check lines are pulled and they immediately float to the surface clearing each line in their upward passage of all obstructions, thereby facilitating the speed of the flotillas in their passage down to the sunken vessel.

I claim—

The arrangement and combination of the floats, chain, chain bill or stopper and chain dividers all arranged substantially as described and for the purposes specified.

Signed this 16th day of August in the year 1856.

JOHN P. JOURDA.

Witnesses:
JOHN J. JACKSON,
THOMAS N. QUINN.